United States Patent
Baliva et al.

(10) Patent No.: US 12,339,195 B2
(45) Date of Patent: Jun. 24, 2025

(54) ASSOCIATED SYSTEM AND METHOD FOR DETECTING THE FINAL LOADS ON A VEHICLE WHEEL BY MEANS OF A SENSORIZED WHEEL HUB UNIT

(71) Applicant: AKTIEBOLAGET SKF, Gothenburg (SE)

(72) Inventors: Simone Baliva, Saluzzo (IT); Marco Cambiano, Cumiana (IT)

(73) Assignee: AKTIEBOLAGET SKF, Gothenburg (SE)

( * ) Notice: Subject to any disclaimer, the term of this patent is extended or adjusted under 35 U.S.C. 154(b) by 210 days.

(21) Appl. No.: 17/991,009

(22) Filed: Nov. 21, 2022

(65) Prior Publication Data

US 2023/0175929 A1 Jun. 8, 2023

(30) Foreign Application Priority Data

Dec. 3, 2021 (IT) .......................... 102021000030599

(51) Int. Cl.
*G01M 17/02* (2006.01)
*B60B 27/00* (2006.01)
*G06N 3/02* (2006.01)

(52) U.S. Cl.
CPC ......... *G01M 17/02* (2013.01); *B60B 27/0068* (2013.01); *G06N 3/02* (2013.01); *B60B 2380/50* (2013.01)

(58) Field of Classification Search
CPC .............. G01M 17/02; B60B 27/0068; B60B 2380/50; B60B 27/001; B60B 27/0084; B60B 27/0089; G06N 3/02; G01L 5/161; G01L 5/167; G01L 25/00; G01L 5/0019; G01L 5/00; G01L 5/1627; F16C 19/522;
(Continued)

(56) References Cited

U.S. PATENT DOCUMENTS 6,619,102 B2   9/2003   Salou et al.
6,658,943 B2   12/2003  McDearmon
(Continued)

FOREIGN PATENT DOCUMENTS

CN   204605503   *  9/2015   ............. Y02T 10/64
CN   113715842   *  11/2021  ............. G06N 3/045
(Continued)

OTHER PUBLICATIONS

Search Report for corresponding Italy Patent Application No. 102021000030599 dated Jul. 7, 2022.
(Continued)

*Primary Examiner* — Nga X Nguyen
(74) *Attorney, Agent, or Firm* — J-TEK LAW PLLC; Scott T. Wakeman; Mark A. Ussai (57) ABSTRACT

A method and system for detecting forces and moments acting on a vehicle wheel, wherein an outer ring of a wheel hub unit has a plurality of strain sensors configured to generate first signals (Ds1) proportional to mechanical stresses on the outer ring and a temperature sensor generating a second signal (Ds2). Further, the detection system comprises a second processing unit configured to process third signals (Dv1,n) corresponding to selected vehicle state parameters; and a third processing unit that receives the third signals and the pseudo-sinusoidal signal and calculates said forces and moments on the vehicle wheel.

13 Claims, 5 Drawing Sheets

(58) Field of Classification Search
CPC ............ F16C 2233/00; F16C 2326/02; B60W 30/045
See application file for complete search history.

(56) References Cited

U.S. PATENT DOCUMENTS

| | | |
|---|---|---|
| 9,518,609 B2 | 12/2016 | Akiyama et al. |
| 2016/0288566 A1* | 10/2016 | Randall ............... B60B 27/0068 |
| 2021/0170789 A1 | 6/2021 | Bertola et al. |
| 2021/0181228 A1* | 6/2021 | Zula ......................... G01P 3/44 |

FOREIGN PATENT DOCUMENTS

| | | |
|---|---|---|
| EP | 2762848 | 8/2014 |
| WO | 2001092078 | 12/2001 |
| WO | 2005108945 | 11/2005 |

OTHER PUBLICATIONS

Search Report for corresponding Italy Patent Application No. 102021000029858 dated Jun. 24, 2022.

\* cited by examiner

ASSOCIATED SYSTEM AND METHOD FOR DETECTING THE FINAL LOADS ON A VEHICLE WHEEL BY MEANS OF A SENSORIZED WHEEL HUB UNIT

CROSS-REFERENCE OF RELATED APPLICATIONS

This application is based on and claims priority to Italian Patent Application No. 102021000030599 filed on Dec. 3, 2021, under 35 U.S.C. § 119, the disclosure of which is incorporated by reference herein.

BRIEF DESCRIPTION OF THE DRAWINGS

The disclosure will now be described with reference to the attached drawings, in which.

DETAILED DESCRIPTION

The present disclosure relates to a method for accurately detecting, in real time, forces and moments (torque) acting on a wheel of a vehicle, by means of a wheel hub unit with sensors, provided with one or more strain gauges or another type of strain sensor. The method provides information to an electronic control unit of the vehicle that can be used to improve and enhance the efficiency of stability control of the vehicle including during maneuvers involving the braking system, and which can be used to optimize management of self-driving functions. The disclosure also relates to an associated detection system that can be fitted to the vehicle.

As is known, the conventional suspension systems only use sensors that are able to detect the speed of rotation of each wheel of a vehicle. However, sensorized suspension systems are able to detect the stresses experienced by the wheel hub unit on which the wheel of the vehicle is mounted, and, therefore, detect the loads/stresses acting on the wheel. As a result of the various driving conditions of the vehicle, for example rough or diverse terrain over which the vehicle is travelling and/or the maneuvers performed, for example, steering, braking, etc., are not currently in use.

U.S. Pat. No. 6,619,102B2 describes a hub bearing unit made up of a rolling bearing, an outer ring of which has a flange for attachment to the suspension upright, provided with radial and circumferential elastic strain zones, to each of which is applied a single strain sensor. This solution, however, has not proved to be efficient in correctly detecting the forces acting on the wheel hub unit, and on the vehicle wheel.

U.S. Pat. No. 6,658,943B2 describes a rolling bearing with a double row of conical rollers in which the radially outer cylindrical lateral surface of the outer ring of the bearing is provided with four sensor modules secured circumferentially to the radially outer cylindrical surface, and angularly spaced apart from one another. Each module consists of a pair of strain sensors arranged at 90° from one another. However, this solution has not proved to be efficient in correctly detecting the forces acting on the wheels.

In essence, apart from the fact that all of the known systems are suitable only for performing tests, but are not compatible with mass production, it has been found that the data supplied by such systems only correspond partially to the stresses actually acting on the wheels, and therefore the information supplied by them is not very useful.

The present disclosure aims to provide a method and an associated system for accurate real-time detection of forces and moments (torque) acting on a wheel of vehicle supported by a wheel hub unit, by means of a duly sensorized wheel hub unit and relevant signal processing, in such a way as to allow effective interaction with a vehicle electronic control unit (ECU).

The disclosure thus provides a method and an associated system for accurate real-time detection of forces and moments (torque) acting on a wheel of vehicle.

Referring to FIGS. 1, 3, 4 and 7, the reference sign 1 generally designates a system for detecting mechanical loads and/or stresses acting on a wheel 2 of a vehicle 3.

As will be seen below, the detection system 1, shown in FIG. 1, makes it possible to detect, accurately and in real time, forces and moments acting on each wheel 2 of the vehicle 3, as illustrated by arrows in FIG. 4.

Figure 1:
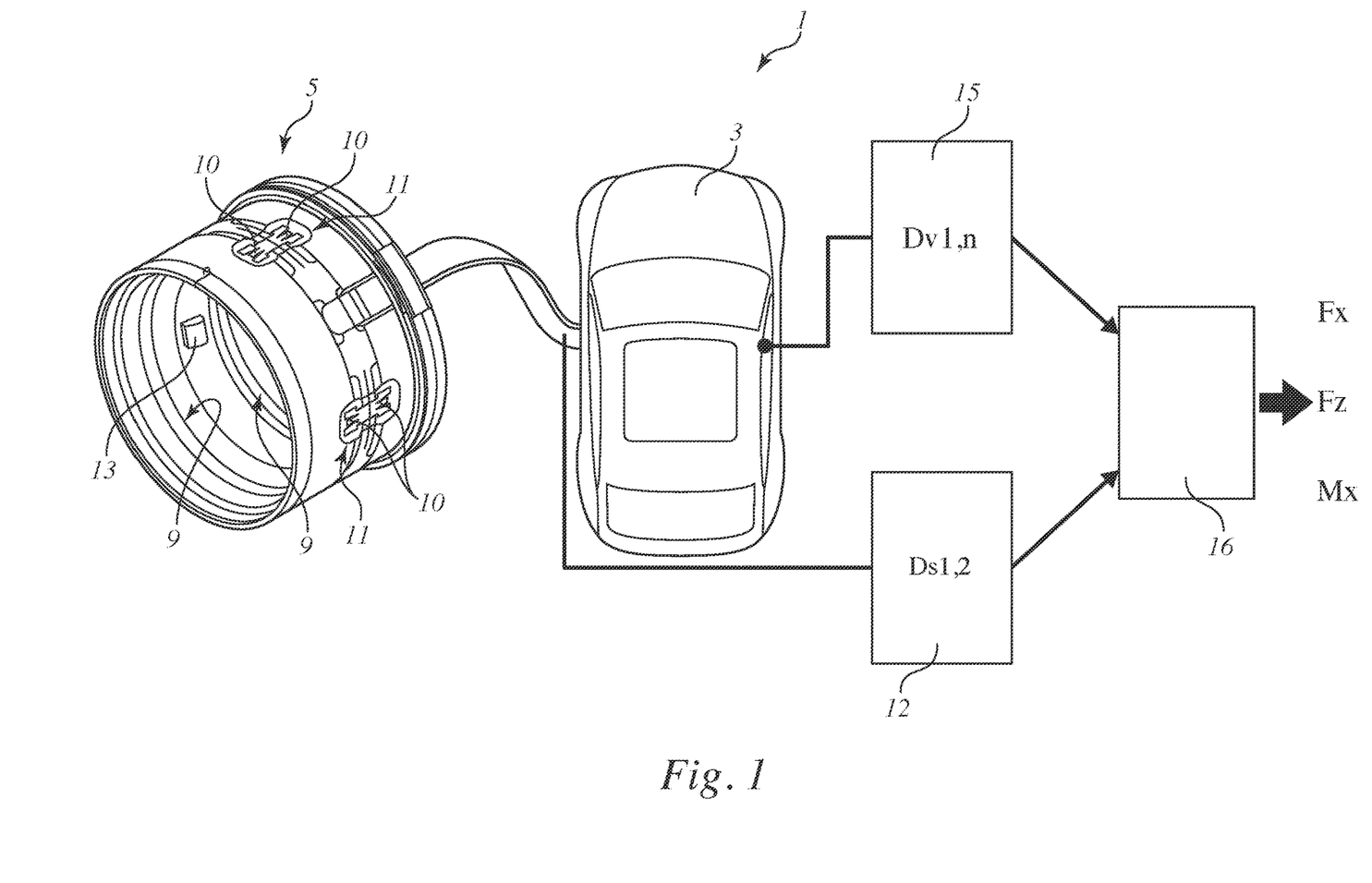
FIG. 1 schematically depicts a system for accurate real-time detection of forces and moments (torque) acting on a vehicle wheel, according to an example embodiment.

Referring to FIG. 1, the detection system 1 may include, for each wheel 2, and an outer ring 5 of a wheel hub unit 6. The wheel hub units 6 are shown only schematically in FIGS. 5(a) and 5(b) and only in block form in FIGS. 2 and 3, respectively.

Figure 5A:
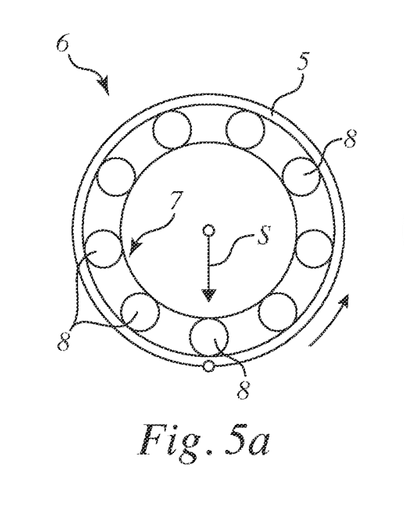
FIGS. 5(a) and 5(b) schematically depict the wheel hub units included in the detection system shown in FIG. 1.
Figure 5B:
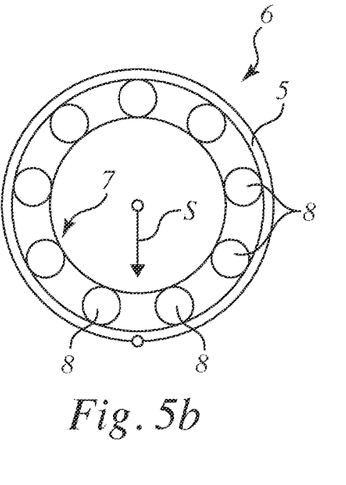

As shown in FIGS. 5(a) and 5(b), each wheel hub unit 6 may include a rolling bearing formed by the outer ring 5, by an inner ring 7, and by a plurality of rolling elements 8 interposed between the inner ring 7 and the outer ring 5. The outer ring is provided radially on the inside with a pair of annular raceways 9 (shown in FIG. 1) for the rolling elements 8.

Referring to FIG. 1, the detection system 1 may further include, for each wheel 2, a plurality of strain sensors 10 carried integral by the outer ring 5. The strain sensors 10 are configured to generate first electrical signals Ds1 (FIG. 1) as a function of respective mechanical stresses S (FIGS. 5(a) and (b)) consisting of forces and moments (torque) acting locally on the outer ring 5.

According to an example embodiment, the strain sensors consist of at least four pairs of strain gauges 10, each pair being arranged in correspondence with a respective elastic strain zone 11 of the outer ring 5. Each of the elastic strain zone 11 including a predetermined circumferential and radial extent. The strain gauges 10 may be of piezoelectric type, for example, consisting of a strip of piezoelectric material adhesively bonded or printed, for example, by screen printing on a thin metal strip, which is in turn soldered to the outer ring 5 on the radially outer lateral surface thereof, or in a seat made in the radial thickness of the outer ring and defining the elastic strain zone 11.

The detection system 1 also may include a first processing unit 12 configured to receive, upon deformation of sensors 10, a plurality of said first electrical signals Ds1 and a second electrical signal Ds2 proportional to an internal temperature of the wheel hub unit 6, for example detected by a temperature sensor 13 as shown in FIG. 1.

Figure 5C:
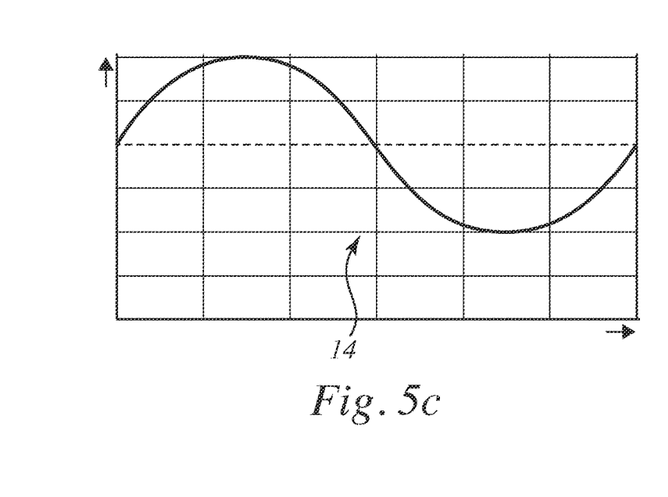
FIG. 5c schematically depicts the generation of electrical signals used in the detection method and system according to an example embodiment.

The processing unit 12 is configured to process and generate a pseudo-sinusoidal signal 14 as shown in FIG. 5C. The pseudo-sinusoidal signal 14 includes frequency and instantaneous amplitude proportional to the mechanical stresses S acting locally on the outer ring 5 in correspondence with the elastic strain zones 11.

Further, the detection system 1 may include, in combination: a second processing unit 15 (FIG. 1) configured to receive and process a plurality of third electrical signals Dv1. Wherein, Dvn corresponds to selected vehicle state parameters, depending on vehicle motion conditions such as direction, speed, etc. The detection system 1 further includes a third processing unit 16 (FIG. 1) configured to receive the third electrical signals Dv1,$n$ and said pseudo-sinusoidal signal 14 from the processing unit 12. Further, upon receiving these signals, the processing unit 16 is configured to calculate in real time, forces and moments applied to the wheel 2. And, further, extrapolating forces and moments, as explained below, on the basis of a series of data previously fed to the third processing unit 16 and corresponding to forces Fx, Fy, Fz and moments Mx (FIG. 4) previously experimentally detected as acting on each wheel 2 following the execution with the vehicle 3 of a series or sequence of predetermined maneuvers, specifically selected from all executable maneuvers, which are substantially infinite.

Figure 4:
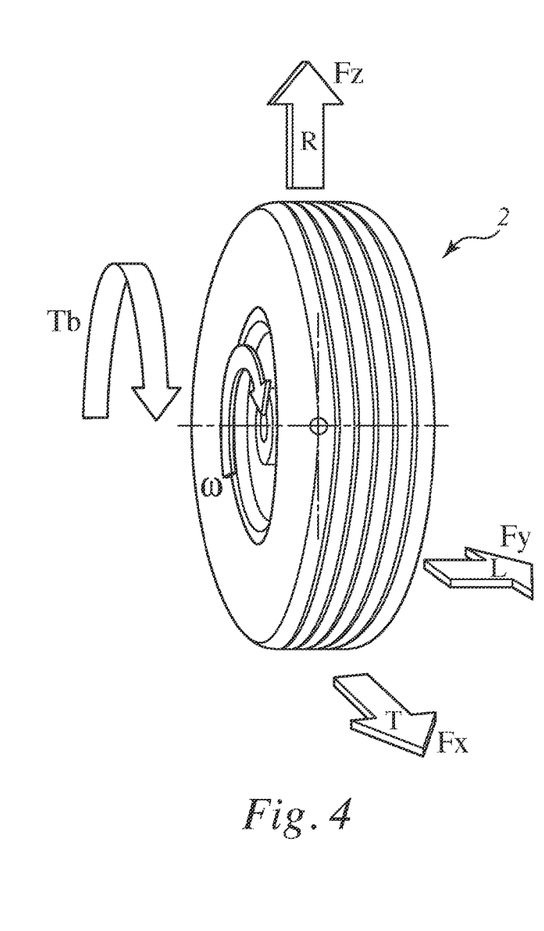
FIG. 4 schematically depicts a vehicle wheel that may be coupled to a wheel hub unit shown in FIG. 1, as well as the mechanical loads/stresses acting on same according to an example embodiment.

The forces Fx, Fy and Fz and the moment Mx that act on a vehicle wheel 2 are shown in FIG. 4 by means of respective arrows; the subscripts x, y and z indicate that the respective forces F and the moment M act respectively along an axis X parallel to a direction of vehicle motion, along an axis Y transverse to the direction of vehicle motion and along an axis Z substantially vertical and perpendicular to the x- and y-axes.

Figure 7:
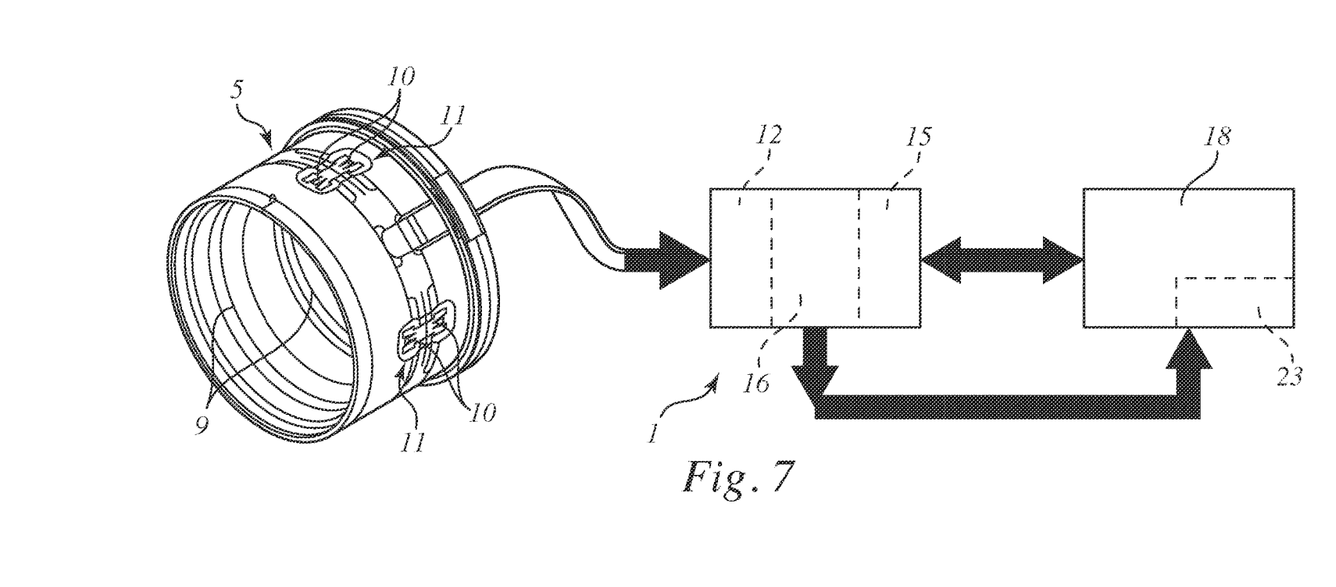
FIG. 7 schematically depicts the way in which the detection method and system of the disclosure interact with a vehicle electronic control unit.

Note also that the processing units 12, 15 and 16 may consist of electronic boards suitably programmed (FIG. 1), and hence may be physical units, or may also consist (wholly or partially) only of software programs or coding blocks loaded on a dedicated electronic control unit and/or vehicle control unit (ECU) 18, as shown in FIG. 7. Alternatively, the processing units 12, 15 and 16 may be combinations of the above embodiments (FIGS. 2 and 3), and hence may not consist of or only partially consist of physical units.

According to an example embodiment, the third processing unit 16 processes the third electrical signals Dv and the pseudo-sinusoidal signal 14 by means of a calibration map previously empirically determined by means of a non-linear regression function, and/or a database based on the data set corresponding to forces and moments experimentally detected on each corresponding wheel 2.

According to an example embodiment, the third processing unit 16 processes the third electrical signals Dv and the pseudo-sinusoidal signal 14 through a "shallow" neural network 19 or "SNN" (FIG. 6) previously trained by means of said data set corresponding to forces Fx,y,z and moments experimentally detected on the wheel 2. The neural network 19 is loaded on/constitutes the processing unit 16.

For example, the processing unit 16, or the neural network 19 may use, in a manner obvious to those skilled in the art, procedures for implementing and verifying a Shallow neural network. Wherein, "Shallow neural network" means a structure consisting of a maximum of two Hidden layers of neurons. In such a "Shallow neural network" each neuron consists of an activation function which in the case at hand is a Sigmoid function, although other types of functions could be used.

Figure 6:
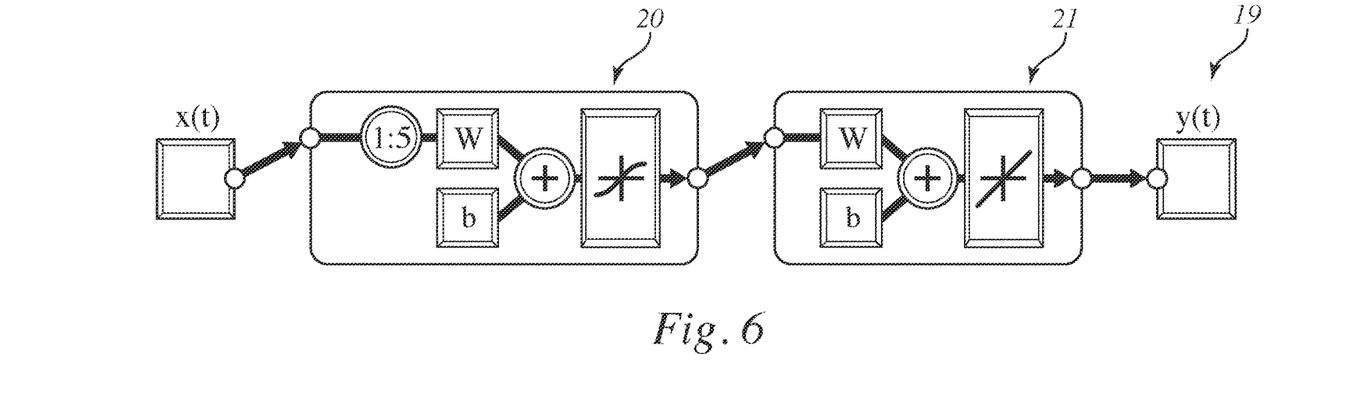
FIG. 6 schematically depicts an example embodiment of an artificial intelligence system that can advantageously be used in the example embodiments disclosed herein.

Still referring to FIG. 6, the "shallow" neural network 19 is chosen/selected from the non-linear regression approach type and may include at least a first layer 20 (hidden) and a second layer 21 (Output) formed by, respectively, at least six neurons and three neurons. This type of neural network is known and may be implemented in a manner obvious to those skilled in the art in the processing unit 16 or the neural network 19.

However, the accuracy of the results that may be obtained, as demonstrated experimentally, depending on the training dataset selected.

According to the present disclosure, it was found experimentally that the accuracy of the results that may be obtained depends on the type and number of maneuvers to be executed by the vehicle 3 during the training step, and on the type and number of vehicle operating parameters that are selected to obtain the signals Dv1,$n$.

According to an example embodiment, in the case of use of a "shallow" neural network such as the network 19, in order to perform the necessary processing in the unit 16, the series of predetermined maneuvers that are absolutely necessary to thus obtain in real time and during normal motion of the vehicle 3 the forces Fx and Fz and the moment Mx acting on the vehicle wheel 2, i.e. to correctly train the neural network 19, may include, for example, at least three ABS braking events with at least 1 g ($1 \times 9.8$ m/sec$^2$) of longitudinal deceleration on the straight; at least three 0.7 g brakes in a straight line; at least three 0.5 g brakes in a straight line; at least two double lane changes with 1 g or more of lateral acceleration; performing a plurality of complete vehicle turns with constant speed and increasing turning radius until loss of grip, both clockwise and counterclockwise; and at least five minutes of mixed normal driving and of drifting during turns.

Moreover, the abovementioned maneuvers may preferably be executed several times, in various conditions of grip of the wheel to the terrain.

Similarly, to obtain the desired results, it has been found experimentally that the selected vehicle state parameters, i.e. the vehicle motion parameters that may necessarily be detected to obtain the signals Sv1,$n$, consisting of, at least, lateral acceleration of the vehicle; longitudinal acceleration of the vehicle; steering angle of the vehicle; vehicle speed; and brake pressure.

These parameters may be taken directly from the CAN (Control Area Network) of the vehicle 3, or may be obtained from dedicated sensors and sent to the processing unit 15. The vehicle speed, for example, may be taken from the CAN, or may be obtained directly from each wheel hub unit 6 in the case where the latter is provided with an encoder for detecting the wheel rotation speed, normally used, for example, in the ABS of the vehicle 3.

Figure 2:
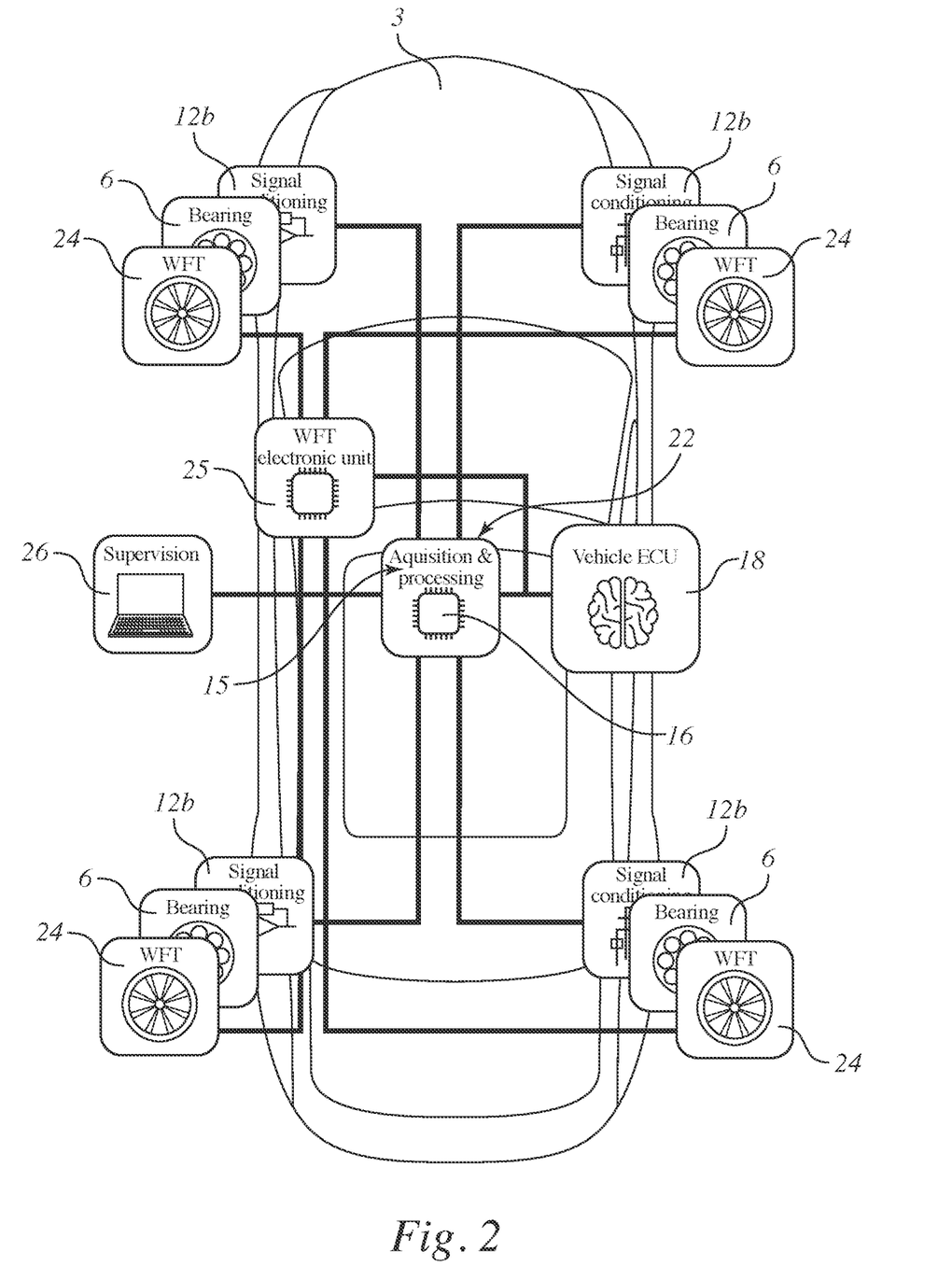
FIGS. 2 and 3 schematically depict a plan view from above of the same vehicle shown in FIG. 1, illustrating the instruments necessary to refine and operate the detection system of the disclosure, according to an example embodiment.
Figure 3:
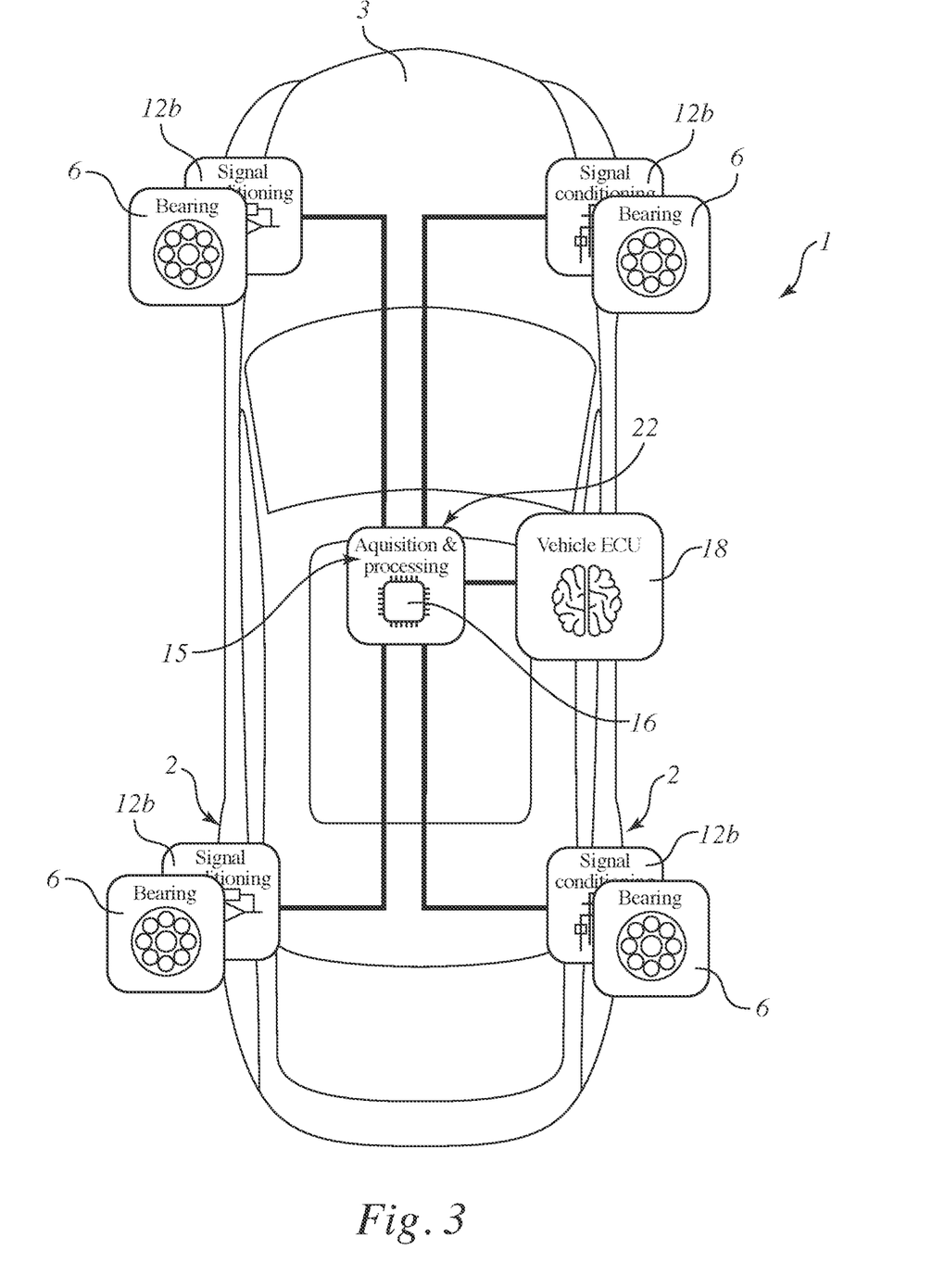

In the non-limiting example shown in FIGS. 2 and 3, the first processing unit 12 may include a first electronic board 12$b$ carried directly (onboard) by the wheel hub unit 6, while the second and third processing unit 15,16 are chosen from the group consisting of, for example, a same second electronic board 22 suitably programmed and thus carrying both units or processing modules 15,16; a second and a third electronic board suitably programmed, which constitute the processing units 15,16; one or more software programs loaded on the vehicle control unit (ECU) 18 carried by the vehicle 3.

Moreover, and in all cases, the third processing unit (or module) 16 (FIG. 7) is configured, according to the disclosure, to write to a register 23 of the vehicle ECU 18 at a sampling interval of the order of ten milliseconds, and the set of data consists of the values of the respective forces Fx and Fz and of a moment Mx acting on each vehicle wheel 2, where x is an axis parallel to a direction of vehicle motion, and z is a substantially vertical axis perpendicular to the x-axis, and to the y-axis, as described above.

The set of data obtained and recorded in the manner described above makes it possible to optimize management of self-driving functions of the vehicle, and to improve and enhance the efficiency of the stability control of said vehicle. This is achieved by virtue of the fact that the detection system 1 may interact directly, in the manner described, with the vehicle control unit 18, or, for example, also with data processing units of a braking system of the vehicle.

It is clear from the above that the disclosure also relates to a method for accurately detecting, in real time, forces and moments acting on a wheel 2 of a vehicle 3 carried by a wheel hub unit 6 comprising an outer ring 5 provided with a plurality of strain sensors 10 integral therewith, said strain sensors 10 being configured to generate first electrical signals Ds1 as a function of respective mechanical stresses S acting locally on the outer ring 5, and a temperature sensor 13 configured to generate a second electrical signal Ds2 proportional to an internal temperature of the wheel hub unit 6.

The detection method according to the disclosure may include a first step, in which a plurality of said first electrical signals Ds1 and the second electrical signal Ds2 are processed to generate a pseudo-sinusoidal signal 14 having an instantaneous frequency and amplitude proportional to the mechanical stresses S.

According to an example embodiment, in this first step use is made of at least four pairs of sensors 10, making a total of at least eight strain sensors 10 which, together with the sensor 13, provide the processing unit or module 12 with a total of nine signals. The processing unit or module 12 processes the pseudo-sinusoidal signal 14 (shown in FIG. 5c) in such a way as to obtain as output a signal of amplitude equal to the difference between the maximum amplitude (when a rolling body 8 moves to a position corresponding to a sensor 10—FIG. 5a), and minimum amplitude (when the sensor 10 is between two adjacent rolling elements 8—FIG. 5b) of the signal 14 and of frequency equal to the frequency of the signal 14, its minimum amplitude never being negative owing to the normal offset of the rolling bearing forming part of the wheel hub unit 6.

The detection method according to the disclosure further may include a second step, in which a plurality of third electrical signals Dv1,n proportional to selected vehicle state parameters are detected and processed. And, a third step in which the third electrical signals Dv1,n and the pseudo-sinusoidal signal 14 are processed to provide in real time forces and moments applied to the wheel 2, by virtue of the fact that the processing is performed on the basis of a series of data consisting in values of forces and moments actually present and previously experimentally detected on the wheel 2 following the execution with the vehicle 3 of a series of specifically selected predetermined maneuvers.

These data are acquired by means of a further step of the method according to the disclosure, which is performed on the duly sensorized vehicle 3, for example by means of dynamometric wheels 24 (FIG. 2) networked to the processing units 15, 16 by means of a WFT (Wheel Force Transducer) unit 25, under the supervision of a supervision unit 26 consisting of a laptop.

According to an example embodiment of the method according to the disclosure, the third step is performed by means of a "shallow" neural network 19 trained by means of said set of specifically selected data obtained from a series of predetermined maneuvers including at least three ABS braking events with at least 1 g longitudinal deceleration on the straight; at least three 0.7 g brakes in a straight line; at least three 0.5 g brakes in a straight line; at least two double lane changes with 1 g or more of lateral acceleration; performing a plurality of complete vehicle turns with constant speed and increasing turning radius until loss of grip, both clockwise and counterclockwise—essentially, the vehicle 3 is driven in a spiral trajectory; and at least five minutes of mixed normal driving and of drifting during turns.

Moreover, the abovementioned maneuvers may preferably be executed several times, in various conditions of grip of the wheel to the terrain.

By virtue of these maneuvers, a set of data are obtained from the dynamometric wheels 24 and supplied to the neural network 19, where they are compared to the data originally processed by said neural network 19 on the basis of the signals processed by the units 12 and 15.

To ensure optimal learning by the neural network 19, it has been found that the signals Ds1,2 may be detected and processed with a sampling frequency of 2 kHz and the selected vehicle state parameters to be detected and processed to obtain the signals Dv1,n consist of, as a minimum lateral and longitudinal acceleration of the vehicle detected with a sampling frequency of 100 Hz; steering angle of the vehicle, detected with a sampling frequency of 100 Hz; speed of the vehicle detected with a sampling frequency of 10 Hz; and brake pressure—for example taken from the ABS—detected with a sampling frequency of 50 Hz.

The methodology described, based on the artificial intelligence approach, allows a solution for detection of the load on the wheels 2, which is efficient and accurate thanks to the integrated and combined use of strain sensors 10 located on the wheel hub unit 6 and basic information on the state of the vehicle 3 available on the CAN communication network of the vehicle 3, such as the angular speed of the wheel 2, the steering angle, the lateral and longitudinal acceleration, etc., as stated above.

This method, based on a "shallow" neural network, applied to wheel hub units makes it possible to measure the forces and the moments acting on the bearing thereof under the operational conditions of the vehicle 3 and to supply this information to the electronic control unit 18 of the vehicle 3, in real time.

The method of the disclosure has also been shown to provide the desired results in terms of key performance criteria (accuracy of the measurement, repeatability of measurements, reactivity, availability with respect to a wider range of speeds of the vehicle) by virtue of the combination of two sources of information (namely strain sensors positioned on the non-rotating part of the bearing and information on the state of the vehicle), compared to known solutions that use only one or other of the sources of information.

We claim:

1. A system for accurate real-time detection of forces and moments acting on a wheel of a vehicle, comprising:
   an outer ring of a wheel hub unit;

a plurality of strain sensors carried integral by the outer ring, the plurality of strain sensors configured to generate first electrical signals (Ds1) as a function of respective mechanical stresses(S) acting on the outer ring;

a first processing unit configured to,
receive, upon deformation of the plurality of sensors, a plurality of said first electrical signals and a second electrical signal (Ds2) proportional to an internal temperature of the wheel hub unit, and
generate a pseudo-sinusoidal signal comprising frequency and instantaneous amplitude proportional to the mechanical stresses;

a second processing unit configured to receive and process a plurality of third electrical signals (Dv1,n) corresponding to selected parameters of the vehicle; and a third processing unit configured to,
receive the plurality of third electrical signals and the pseudo-sinusoidal signal,
calculate, in real time, on the basis of the received plurality of third electrical signals and the pseudo-sinusoidal signal, forces and moments applied to the vehicle wheel,
extrapolating the forces and moments on the basis of a series of data previously fed to said third processing unit and corresponding to forces and moments previously experimentally detected on the vehicle wheel following the execution with the vehicle of a series of predetermined maneuvers.

2. The detection system of claim 1, wherein:
each one of the plurality of strain sensors comprises at least four pairs of strain gauges,
each pair of the strain gauges is arranged in correspondence with a respective elastic strain zone of the outer ring,
the respective elastic strain zone includes a predetermined circumferential and radial extent; and
each pair of the strain gauges are piezoelectric.

3. The detection system of claim 1, wherein:
the third processing unit is configured to process the plurality of third electrical signals and the pseudo-sinusoidal signal based on a calibration map, and
the calibration map is previously empirically determined based on a non-linear regression function and a database based on a data set corresponding to forces and moments experimentally detected on the vehicle wheel.

4. The detection system of claim 1, wherein:
the third processing unit is configured to process the plurality of third electrical signals and the pseudo-sinusoidal signal through a shallow neural network, and
the shallow neural network is previously trained based on a data set corresponding to forces and moments experimentally detected on the vehicle wheel.

5. The detection system of claim 4, wherein:
the shallow neural network is of a non-linear regression approach type and comprises at least a first layer and a second layer, and
the first layer is formed of at least six neurons and the second layer is formed of at least three neurons.

6. The detection system of claim 4, wherein the shallow neural network is configured to receive and process signals corresponding to a set of predetermined maneuvers, the signals comprising at least one of:
signals resulting from at least three ABS braking events with at least 1 g of longitudinal deceleration in a straight line;
signals resulting from at least three 0.7 g braking events in a straight line;
signals resulting from at least three 0.5 g braking events in a straight line;
signals resulting from at least two double line lane changes with 1 g or more of lateral acceleration;
signals consequent to the execution of a plurality of complete vehicle turns with constant speed and increasing steering radius until the loss of adherence, both clockwise and counterclockwise; and
signals resulting from performing at least five minutes of mixed normal driving and drifting during turns.

7. The detection system of claim 4, wherein the shallow neural network is configured to receive and process signals corresponding to the selected vehicle state parameters, the signals comprising at least one of:
vehicle lateral acceleration signals;
vehicle longitudinal acceleration signals;
vehicle steering angle signals;
vehicle speed signals; and
brake pressure signals.

8. The detection system of claim 1, wherein the first processing unit comprises a first electronic board carried by the wheel hub unit.

9. The detection system of claim 1, wherein,
the second and third processing units are selected from the group consisting of: a same second electronic board suitably programmed, a second and a third electronic board suitably programmed, and one or more software programs loaded on a vehicle control unit or ECU; and
the third processing unit is configured to write to a register of the vehicle ECU at a sampling interval of the order of ten milliseconds, a set of data comprising respective forces (Fx and Fz) and a moment (Mx) acting on the vehicle wheel,
wherein x is an axis parallel to a direction of vehicle motion, y is an axis transverse to the direction of vehicle motion and z is a substantially vertical axis perpendicular to the x- and y-axes.

10. A method for accurately detecting, in real time, forces and moments acting on a wheel of a vehicle carried by a wheel hub unit, comprising:
a first step in which a plurality of first electrical signals and second electrical signals are processed to generate a pseudo-sinusoidal signal comprising an instantaneous frequency and amplitude proportional to mechanical stresses;
a second step of detecting and processing a plurality of third electrical signals (Dv1,n) proportional to selected vehicle state parameters; and
a third step in which each of the plurality of third electrical signals and the pseudo-sinusoidal signal are processed to provide in real time the forces and moments (Fx,y;Mx) applied to the vehicle wheel, the third step being performed on the basis of a series of data comprising values of forces and moments experimentally detected on the vehicle wheel following execution of a series of predetermined maneuvers by the vehicle,
wherein the wheel hub unit comprises an outer ring provided with a plurality of strain sensors integral therewith, each of the plurality of strain sensors being configured to generate first electrical signals (Ds1) as a function of respective mechanical stresses(S) acting locally on the outer ring, and a temperature sensor configured to generate a second electrical signal (Ds2) proportional to an internal temperature of the wheel hub unit.

11. The method of claim 10, wherein the third step is performed by a shallow neural network trained by data set.

12. The method of claim 10, wherein the set of predetermined maneuvers comprises:
- at least three ABS braking events with at least 1 g longitudinal deceleration in a straight line;
- at least three 0.7 g braking events in a straight line;
- at least three 0.5 g braking events in a straight line;
- at least two double lane changes with 1 g or more of lateral acceleration;
- performing a plurality of complete vehicle turns with constant speed and increasing turning radius until loss of grip, both clockwise and counterclockwise; and
- at least five minutes of mixed normal driving and of drifting during turns.

13. The method of claim 11, wherein the selected vehicle state parameters comprise at least one of:
- lateral acceleration of the vehicle;
- longitudinal acceleration of the vehicle;
- steering angle of the vehicle;
- vehicle speed; and
- brake pressure.

* * * * *